United States Patent [19]
Keith et al.

[11] 4,444,478
[45] Apr. 24, 1984

[54] HYBRID CAMERA ARRANGEMENT

[75] Inventors: Laura E. Keith, Reading; Marie T. Smyth, Sudbury; George D. Whiteside, Lexington, all of Mass.

[73] Assignee: Polaroid Corporation, Cambridge, Mass.

[21] Appl. No.: 442,238

[22] Filed: Nov. 16, 1982

[51] Int. Cl.³ ............................................. G03B 7/14
[52] U.S. Cl. ..................... 354/417; 354/403; 354/195.11
[58] Field of Search ............ 354/27, 29, 33, 195, 354/198

[56] References Cited
U.S. PATENT DOCUMENTS

| | | | |
|---|---|---|---|
| 3,464,332 | 9/1969 | Davison et al. | 95/10 |
| 3,628,437 | 12/1971 | Fahlenberg | 95/53 E |
| 3,975,744 | 8/1976 | Johnson et al. | 354/29 |
| 4,040,072 | 8/1977 | Johnson et al. | 354/173 |
| 4,047,190 | 9/1977 | Johnson et al. | 354/27 |
| 4,064,519 | 12/1977 | Kee | 354/141 |
| 4,167,316 | 9/1979 | Johnson et al. | 354/197 |
| 4,192,587 | 3/1980 | LaRocque et al. | 354/27 |
| 4,299,461 | 11/1981 | Coppa et al. | 354/27 |
| 4,306,786 | 12/1981 | Carcia et al. | 354/23 D |
| 4,315,676 | 2/1982 | LaRocque et al. | 354/27 |
| 4,317,624 | 3/1982 | Shenk | 354/195 |
| 4,329,031 | 5/1982 | Carcia et al. | 354/27 |

*Primary Examiner*—Russell E. Adams
*Attorney, Agent, or Firm*—Edward S. Roman

[57] ABSTRACT

A "hybrid" exposure control system for a photographic camera apparatus controls exposure in response to both the firing of a quench strobe at an appropriate size aperture corresponding to the determined camera-to-subject distance and to the subsequent quenching of the strobe in response to the detection and integration of reflected strobe light from the scene in correspondence with the scene light admitted to the film plane. An increased degree of exposure correction can thus be made possible since a slight error in determining the camera-to-subject range can be compensated by the detection and integration of reflected strobe light to provide a flash quenching signal.

10 Claims, 7 Drawing Figures

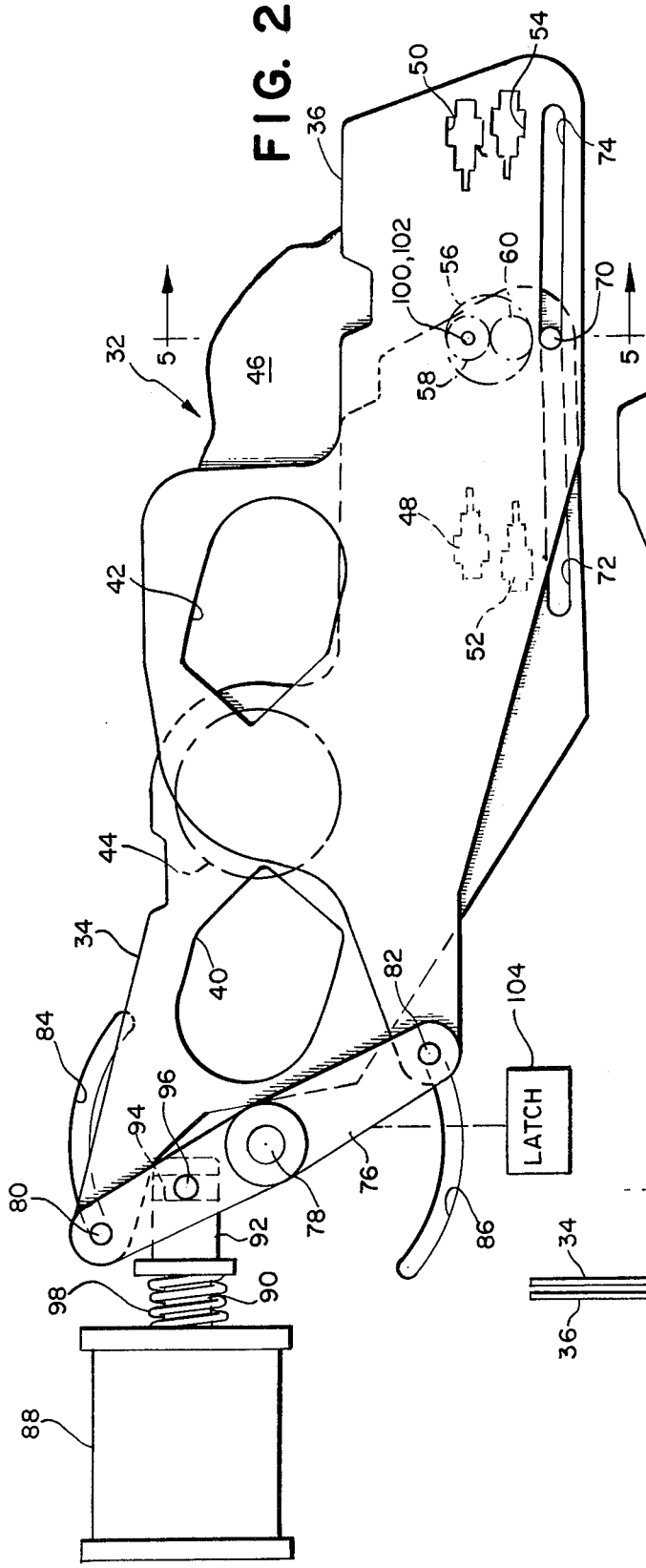
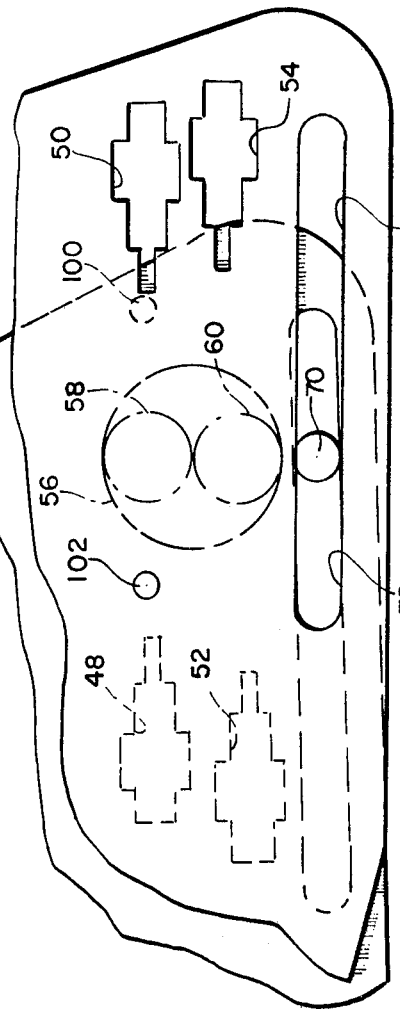
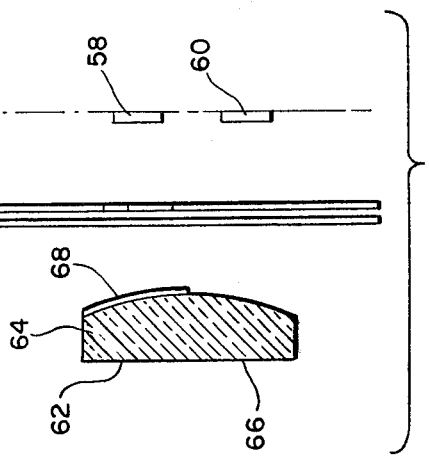

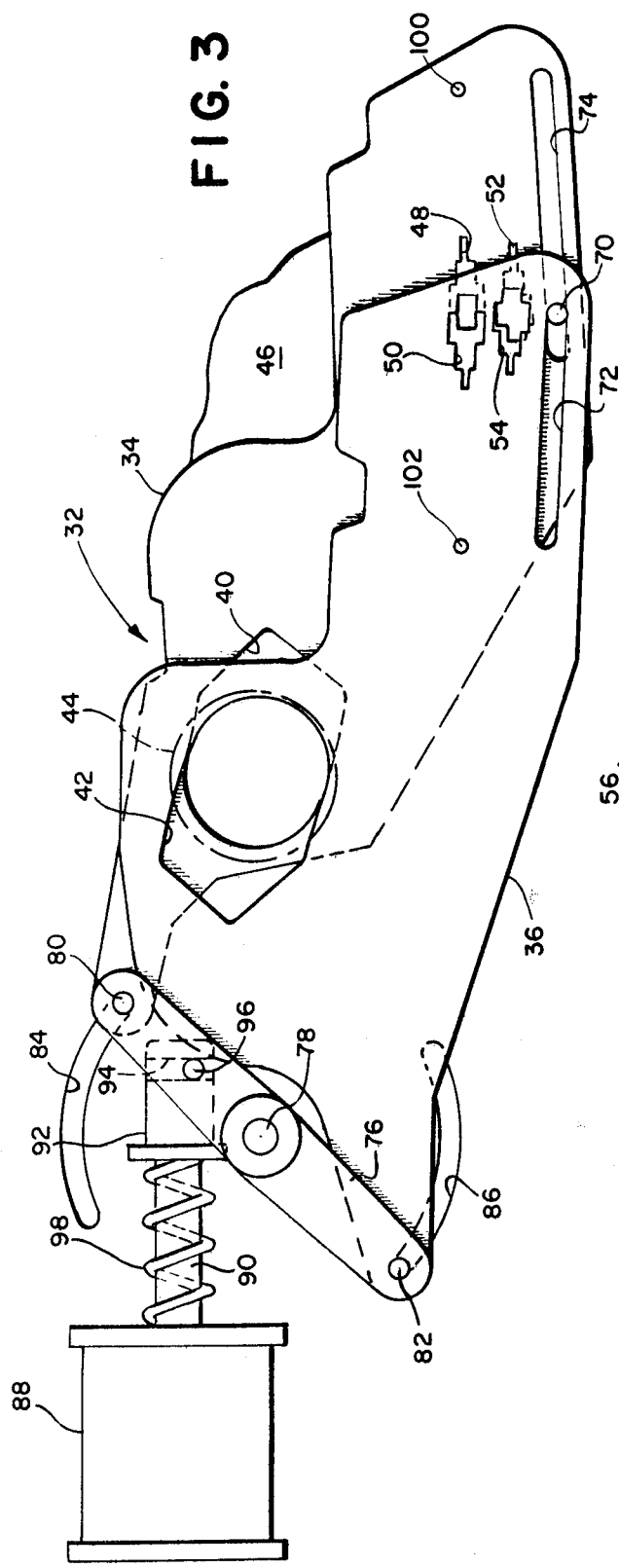
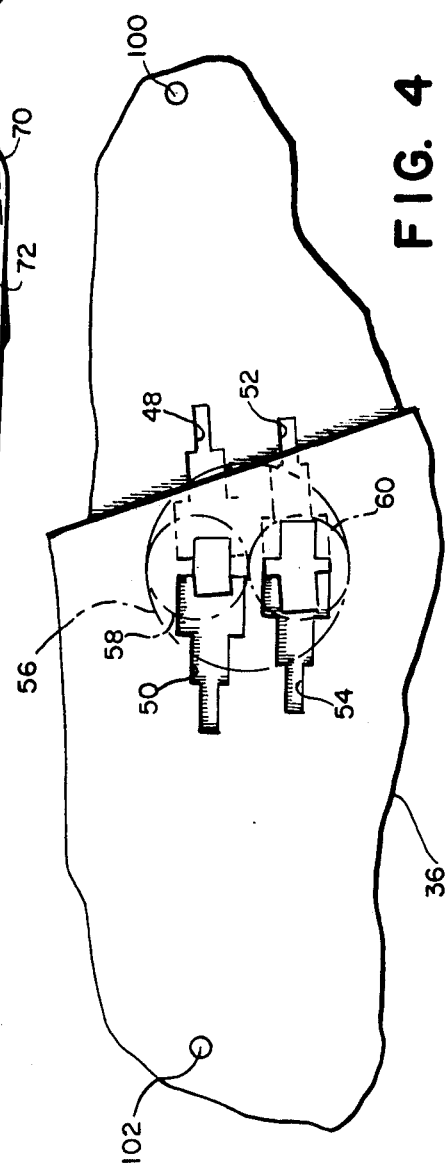

HYBRID CAMERA ARRANGEMENT

BACKGROUND OF THE INVENTION

1. Field of the Invention

This invention relates generally to a "hybrid" exposure control system for a photographic camera apparatus and, more particularly, to a "hybrid" exposure control system for a photographic camera apparatus utilizing a quench strobe.

2. Description of the Prior Art

So-called "hybrid" exposure control systems are well known in the art and generally operate to control exposure in response to both firing a flash lamp at an appropriate aperture size calculated to generally correspond to the determined camera-to-subject distance in accordance with the inverse square law of light and the subsequent detection and integration of reflected artificial illumination from the scene to provide a shutter blade closing command signal. This makes possible an increased degree of exposure correction since a slight error in the determination of camera-to-subject range resulting in a corresponding error in the aperture size at which the flash lamp is fired can be easily compensated by the detection and integration of the reflected artificial illumination to provide the shutter blade closing command signal. Such "hybrid" exposure control systems are disclosed in U.S. Pat. No. 3,464,332, entitled "Automatic Exposure Control System", by R. H. Davison et al., issued Sept. 2, 1979 in common assignment herewith, U.S. Pat. No. 3,975,744, entitled "Automatic Exposure Control System", by B. K. Johnson et al., issued Aug. 17, 1976, and U.S. Pat. No. 4,047,190, entitled "Hybrid Exposure Control System Employing Dual Maximum Blade Displacement", by B. K. Johnson et al., issued Sept. 6, 1977. Such "hybrid" exposure control systems as those disclosed above contemplate only the use of an ordinary flash lamp as the source of artificial illumination since the burn time of an ordinary flash lamp is sufficiently long as to allow the exposure to be terminated by the closing shutter blades. Thus such systems have not heretofore been adapted for use with electronic flash.

Therefore, it is a primary object of this invention to provide a "hybrid" exposure control system for a photographic camera apparatus utilizing an electronic flash or strobe of the quench type for its source of artificial illumination.

It is a further object of this invention to provide a "hybrid exposure" control system in which a quench strobe is fired at an appropriate aperture size corresponding to the determined camera-to-subject distance and wherein the strobe is subsequently quenched as a function of reflected scene light detected in correspondence with the reflected scene light admitted to the film plane during the exposure interval.

Other objects of the invention will be in part obvious and will in part appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 2 is a front elevational view showing portions of the shutter blade mechanism of FIG. 1;

FIG. 2a is a fragmentary front elevational view showing portions of the shutter blade mechanism of FIG. 2 at a different position;

FIG. 3 is a front elevational view showing the shutter blade mechanism of FIG. 2 in still another position;

FIG. 4 is a fragmentary front elevational view showing portions of the shutter blade mechanism of FIG. 2 in still another position;

FIG. 5 is a cross-sectional view across the lines 5—5 of FIG. 2;

SUMMARY OF THE INVENTION

Figure 1:
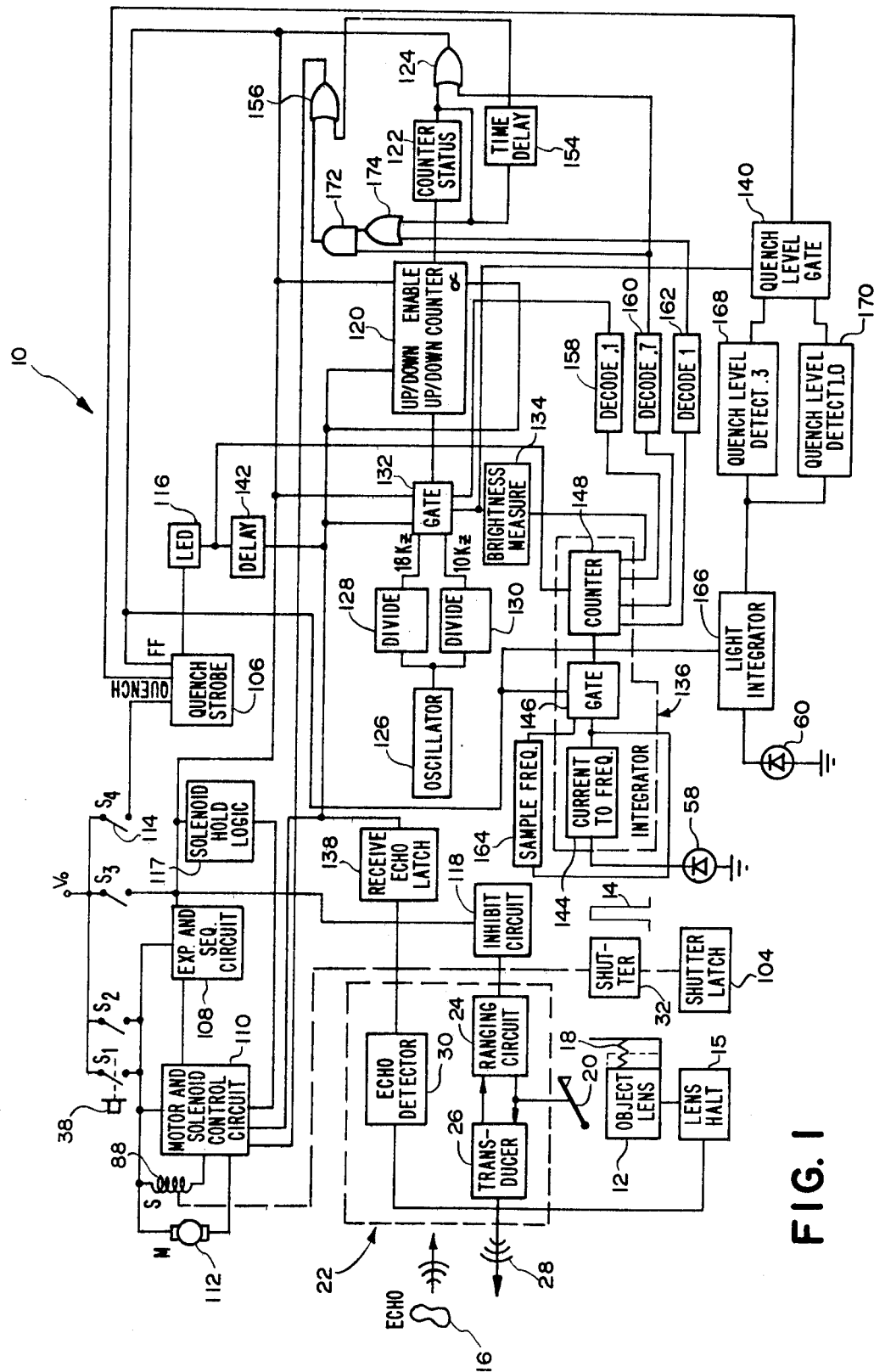
FIG. 1 is a schematic circuit block diagram of the photographic exposure control system and apparatus of this invention.

A photographic camera for use with an electronic flash of the quench type and including means for defining a film plane comprises a rangefinding means for providing an output response generally corresponding to the distance from the camera to a photographic subject to be photographed. There is also included a blade mechanism together with means for mounting the blade mechanism for displacement from an initial closed arrangement wherein the blade mechanism precludes scene light from being transmitted to the film plane to an open arrangement wherein the blade mechanism defines a maximum size aperture to allow the passage of scene light to the film plane and then to a final closed arrangement wherein the blade mechanism again precludes scene light from being transmitted to the film plane. Actuatable drive means are also provided for effecting the displacement of the blade mechanism from its initial closed arrangement to its open arrangement and then to its final closed arrangement to define an exposure interval in which scene light is incident upon the film plane. Means are provided for detecting and integrating scene light in correspondence with the scene light admitted by the blade mechanism to the film plane during the photographic exposure interval and for providing an output signal in response to the detected and integrated scene light. Control means respond to the output response from the rangefinding means to provide a flash fire signal during the exposure interval to ignite the electronic flash when the blade mechanism defines an aperture value corresponding to the camera-to-subject distance. The control means thereafter respond to the output signal from the scene light detecting and integrating means to provide a quench signal to quench the electronic flash. In this manner, the exposure is determined as a "hybrid" function of both camera-to-subject range and scene brightness.

The control means further operate to maintain a select ratio between that portion of the film exposure attributable to ambient scene light and reflected flash light within determinate limits of camera-to-subject distance and ambient scene light intensity. The scene light detecting and integrating means may also comprise first and second photoresponsive elements for receiving scene light in correspondence with the scene light admitted by the blade mechanism to the film plane to provide a first output signal responsive to the scene light incident to the first photocell and a second photocell output responsive to the scene light incident to the second photocell. The control means also respond to the first output signal from the scene light detecting and integrating means to provide a blade close command signal and thereby actuate the drive means to effect the displacement of the blade mechanism back to its final closed arrangement. The control means also respond to the second output signal from the scene light detecting and integrating means to provide the quench signal.

DESCRIPTION OF THE PREFERRED EMBODIMENTS

Referring now to FIG. 1 there is shown at 10 a schematic circuit block diagram for the photographic camera apparatus of this invention. The camera apparatus 10 includes an objective lens arrangement or assembly as shown in simplified fashion at 12, disposed for movement between a plurality of different focal positions. During each film exposure operation, the objective lens assembly 12 is displaced to one of its focal positions for focusing at a focal plane 14, image-forming light rays from a respective photographic subject as shown at 16 located within a given range of distances from the camera apparatus. As is readily apparent, the lens assembly 12 has adapted each of its plurality of focal positions to focus at the focal plane 14 of the camera, an image of a photographic subject located at a different distance from the camera within the given range of distances.

Lens assembly 12 is biased to move through its plurality of different focal positions by a tension spring 18 and may be held at an initial terminal position as shown at solid lines by a releasable latch 20. A spring 18 operates to bias the lens assembly 12 to move toward another terminal position as shown by the phantom lines. The lens assembly 12 while in its initial terminal position (solid lines) operates to focus image-forming light rays from a photographic subject located at the closest possible distance to the camera within the aforementioned camera-to-subject distance range and while in its other terminal position (phantom lines) operates to focus image-forming light rays from a photographic subject located at the furthest possible distance from the camera within the aforementioned camera-to-subject distance range. The movement of the lens assembly 12 from its initial terminal position towards its other terminal position operates to progressively focus image-forming rays from corresponding subjects located at progressively increasing distances from the camera.

The photographic camera apparatus 10 is also provided with a sonic rangefinder as shown generally at 22 and which is more fully disclosed in U.S. Pat. No. 4,167,316, entitled "Sonar Controlled Lens Focus Apparatus", by B. K. Johnson et al., issued Sept. 11, 1979, in common assignment herewith and now incorporated by reference herein. The sonic rangefinder 22 includes a ranging circuit 24 which may be actuated in a manner to be herein described to issue a transmit commence signal to a sonic transducer 26 so as to cause the transmission of a sonar ranging signal comprising a burst of sonic energy as shown at 28. The transducer 26 thereafter operates to detect an echo signal reflected from the photographic subject 16 at an elapsed time interval subsequent to the transmission of the sonar ranging signal. An echo detector 30 then provides a signal indicative of this elapsed time period which corresponds directly to the distance between the camera and the subject 16 to be photographed. Thus, the sonic rangefinder 22 provides an indication of an elapsed time period which corresponds directly to the distance between the camera and the subject to be photographed for reasons which will become more apparent in the following paragraphs.

Intermediate the objective lens arrangement 12 and the focal plane 14, there is provided a shutter mechanism that is shown generally at 32 comprising two overlapping shutter blade elements 34 and 36 (see FIGS. 2-5) of the so-called scanning type which will be subsequently described in greater detail herein. The photographic camera apparatus is also provided with a photographic cycle initiating button as shown at 38 in FIG. 1 wherein the depression of the button 38 operates to commence an exposure interval by ultimately effecting the release of the shutter blade elements 34 and 36 in a manner to be subsequently described herein.

Referring now to FIGS. 2-5, it can be seen that a pair of scene light admitting primary apertures 40 and 42 are provided, respectively, in the blade elements 34 and 36 to collectively define a progressive variation of effective primary aperture openings in accordance with simultaneous longitudinal and lateral displacement of one blade element with respect to the other blade element in a manner as is fully described in U.S. Pat. No. 3,942,183, entitled "Camera with Pivoting Blades", by G. D. Whiteside, issued Mar. 2, 1976, in common assignment herewith and now incorporated by reference herein. The apertures 40 and 42 are selectively shaped so as to overlap a light entry exposure opening 44 in a baseblock casting 46 thereby defining a gradually varying effective aperture size as a function of the position of the blade elements 34 and 36. The shutter blade element 34 has two spaced apart photocell sweep secondary apertures 48 and 52 which overlap, respectively, two spaced apart photocell sweep secondary apertures 50 and 54 in the shutter blade element 36. The secondary photocell sweep apertures 48, 50, 52 and 54 are configured in correspondence with the shapes of the scene light admitting primary apertures 40 and 42 and, as is readily apparent, move in correspondence with the primary apertures 40 and 42 to define two spaced apart pairs of small secondary apertures for admitting the passage of scene light to a scene light detecting station as shown generally at 56.

The scene light detecting station 56, in turn, comprises two photoresponsive elements 58 and 60 which may be discrete photodiodes formed on a single integrated circuit chip. As is readily apparent, the photoresponsive element 58 is aligned to receive scene light by way of the effective secondary aperture defined by the overlapping photocell sweep apertures 48 and 50, while in like manner the photoresponsive element 60 is aligned to receive scene light by way of the effective secondary aperture defined by the overlapping photocell sweep apertures 52 and 54.

Light from the scene is directed to the photocell sweep secondary apertures by a photocell lens 62 having an upper lens portion 64 preferably overlayed with a spectral filter 68 and a lower lens portion 66 having no spectral filter overlay. In the preferred mode, the spectral filter 68 will be of a type that will attenuate electromagnetic frequencies in the near IR region (e.g., 700-1200 nanometers). Thus, the upper lens portion 64 including the spectral filter 68 will transmit visible spectral energy to the exclusion of infrared spectral energy whereas the lower lens portion 66 will transmit both IR frequency spectral energy as well as visible spectral energy. It will also be well within the scope of this invention to provide the lower lens portion 66 with an overlay spectral filter which would operate to pass only infrared spectral energy while attenuating visible spectral energy.

Projecting from the baseblock casting 46 at a location spaced laterally apart from the light entry exposure opening 44 is a pivot pin or stud 70 which pivotally and translatably engages elongate slots 72 and 74 formed in respective shutter blade elements 34 and 36. Pin 70 may be integrally formed with the baseblock casting 46, and blade elements 34 and 36 may be retained in engaging relation with respect to the pin 70 by any suitable means such as peening over the outside end of the pin 70.

The opposite ends of the blade elements 34 and 36 respectively include extended portions which pivotally connect to a walking beam 76. The walking beam 76, in turn, is disposed for rotation relative to the baseblock casting 46 by pivotal connection to a projecting pivot pin or stud 78 which may be integrally formed with the baseblock casting 46 at a location spaced laterally apart from the light entry exposure opening 44. The walking beam 76 may be pivotally retained with respect to the pin 78 by conventional means such as an E ring (not shown). In the preferred mode, the walking beam 76 is pivotally connected at its distal ends to the shutter blade elements 34 and 36 by respective pin members 80 and 82 which extend laterally outward from the walking beam 76. Pin members 80 and 82 are preferably circular in cross section and extend through respective openings in respective blade elements 34 and 36 so as to slidably engage respective arcuate tracks 84 and 86 which may be integrally formed within the baseblock casting 46. The arcuate tracks 84 and 86 operate to inhibit disengagement of the blade elements 34 and 36 from their respective pin members 80 and 82 during operation of the exposure control system. Thus, the walking beam 76 and shutter blade elements 34 and 36 collectively define a blade mechanism together with a means for mounting the blade mechanism for displacement including pivot pins 70 and 78.

Drive means are provided for displacing the blade mechanism 32 and include a tractive electromagnetic device in the form of a solenoid 88 employed to displace the shutter blades 34 and 36 with respect to each other and the baseblock casting 46. The solenoid 88 includes an internally disposed cylindrical plunger unit 90 which retracts inwardy into the body of the solenoid upon energization of the solenoid winding. The plunger 90 includes an endcap 92 at the outside end thereof together with a vertical slot or groove 94 within the endcap 92 for loosely engaging a pin 96 extending outwardly from the walking beam 76. In this manner, the solenoid plunger 90 is affixed to the walking beam 76 so that longitudinal displacement of the plunger 90 will operate to rotate the walking beam around the pivot pin 78 so as to appropriately displace the shutter blades 34 and 36. The drive means may additionally include a helical compression spring 98 so as to continuously urge the blade elements 34 and 36 into positions defining their largest effective aperture over the light entry exposure opening 44. As will be readily understood in some shutter blade arrangements, it may be preferable to use a tension spring in place of the compression spring 98 in a manner as is shown in U.S. Pat. No. 4,040,072, entitled "Shutter Latch Arrangement Releasable Through Shutter Blade Actuation and Resettable Through Film Advancement", by B. K. Johnson, issued Aug. 2, 1977, in common assignment herewith and now incorporated by reference herein. Thus, with the spring connection herein described, the exposure control system of this invention is biased to continuously urge the shutter blade elements 34 and 36 into an open orientation.

The shutter blade elements 34 and 36 are respectively provided with another set of scene brightness detect apertures 100 and 102. The scene brightness detect apertures 100 and 102 overlap each other to provide an aperture of predetermined value that is aligned with the photoresponsive element 58 so as to permit passage of light from the scene to impinge upon the photoresponsive element 58 when the shutter blades 34 and 36 are moved to the positions as shown in FIG. 2 in a manner to be more fully described in the following paragraphs.

In order that the shutter blade elements 34 and 36 may be maintained in their scene light blocking arrangement without requiring a continuous energization of the solenoid 88, there is provided a latch mechanism 104 of a type as is fully described in U.S. Pat. No. 4,040,072, supra.

The camera is preferably intended for use with an electronic flash or strobe of the quench type as shown at 106 wherein the strobe triggering and quenching circuits may all be of types well known in the art. The quench strobe 106 preferably derives charging power from a battery that is insertable within the camera in correspondence with the film pack or cassette in a manner that is well known in the art for Polaroid SX-70 type film cassettes and cameras.

The aforementioned film cassette battery is also preferably utilized to power the circuitry of FIG. 1 in its entirety by way of three switches $S_1$, $S_2$ and $S_3$ in a manner as is more fully described in U.S. Pat. No. 4,040,072, supra. The camera of this invention is also provided with an exposure and sequencing circuit 108 and a motor and solenoid control circuit 110 which operate in a manner also more fully described in U.S. Pat. No. 4,040,072, supra. As is readily apparent, the motor and solenoid control circuit 110 operates to control the energizing current delivered to the solenoid 88 and to a motor 112. The film units intended for use with a camera of this invention are preferably of the self-developing type, and the motor 112 is provided to effect the advancement and processing of the self-developing film units in a well-known manner.

Figure 6:
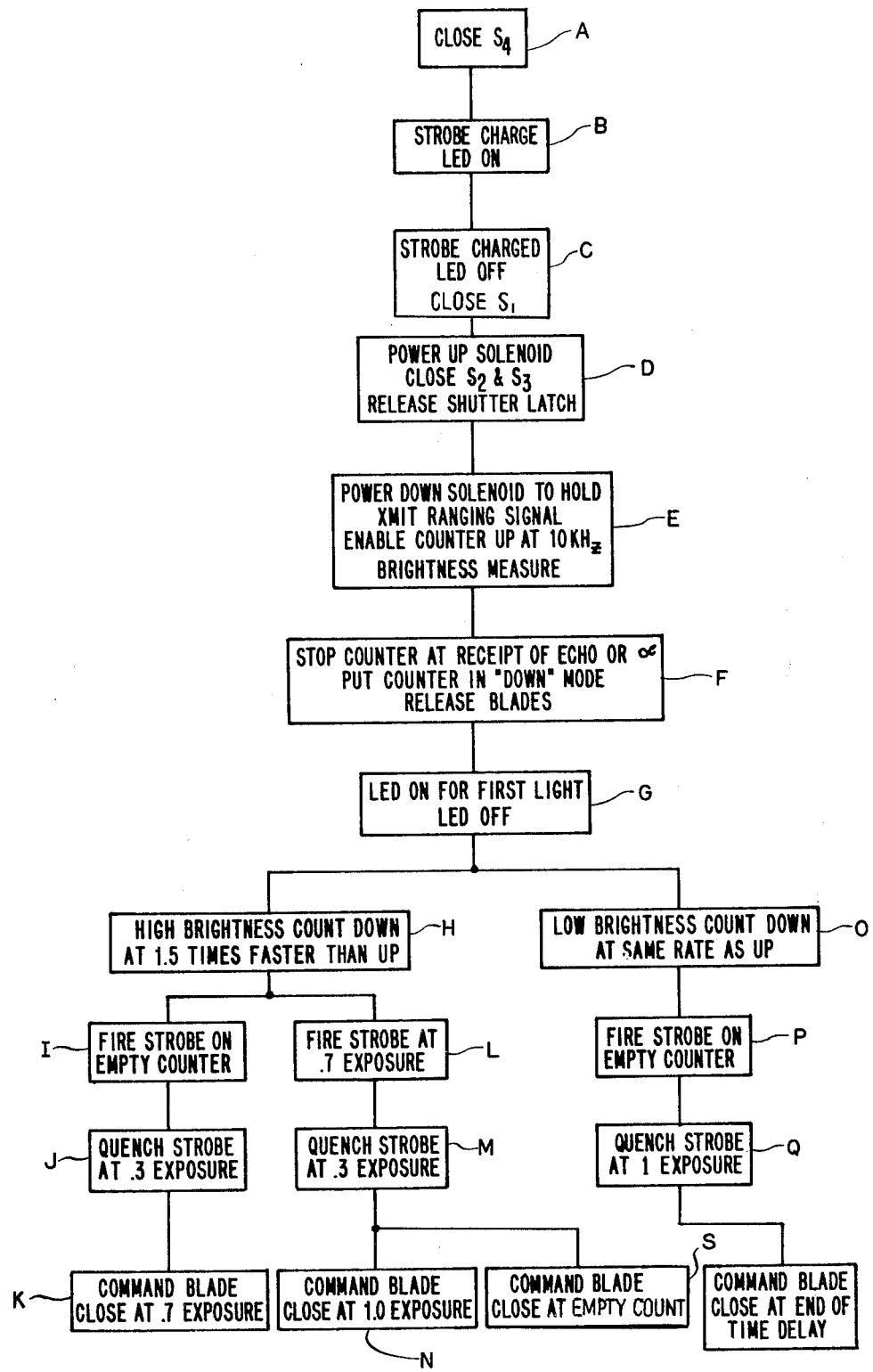
FIG. 6 is a flowchart showing an automatic sequence of operations for the exposure control system of FIG. 1.

Referring now to FIG. 6 in conjunction with FIG. 1, there is shown a sequence of operations through which the camera is automatically guided to provide artificial illumination by way of the quench strobe 106 under varying conditions of ambient scene light intensity and camera-to-subject range. In order for a photographer to commence a photographic exposure cycle, he must first energize the quench strobe 106 by manually actuating a strobe charge button 114 (block A) so as to close switch $S_4$ and effect the charging of the strobe 106 in a well-known manner. During the time that the strobe 106 is charging (block B) there is provided an affirmative logic signal which is operative to energize an LED 116 in a manner as is fully described in U.S. Pat. No. 4,192,587, entitled "Proportional Fill Flash", issued Mar. 11, 1980, in common assignment herewith and now incorporated by reference herein. The light from the LED 116 is made visible to the photographer and thus provides him with a visual indication that the strobe 106 is in a state of charging and that the photographic cycle initiating button 38 should not be depressed. However, if the photographer should try to actuate the photographic cycle initiating button 38 prematurely prior to the strobe 106 reaching its fully charged condition while the LED 116 is energized, there may be provided a system for inhibiting the camera in a manner as is more fully described in U.S. Pat. No. 4,064,519, entitled "Regulated Strobe for Camera With Sixth Flash Inhibit", by R. C. Kee, issued Dec. 20, 1977, in common assignment herewith and now incorporated by reference herein.

When the strobe 106 is fully charged in readiness for a photographic exposure cycle, there is provided the requisite affirmative logic signal to turn off the LED 116 (block C) in a manner as is more fully described in U.S. Pat. No. 4,192,587, supra. Once the LED 116 is deenergized, a photographer may initiate a photographic exposure cycle by manually actuating the button 38 so as to close the switch $S_1$ (block C) in the manner as is fully described in U.S. Pat. No. 4,040,072, supra. Closure of the switch $S_1$, in turn, energizes the exposure sequencing circuit 108 so as to provide a solenoid drive signal to the motor and solenoid control circuit 110. The motor and solenoid control circuit 110, in turn, energizes the solenoid 88 (block D) to retract the plunger 90 inwardly and rotate the walking beam 76 in a counterclockwise direction from an intermediate position in which the photocell sweep secondary apertures and scene brightness apertures are aligned in position as shown in FIG. 2a to a terminal position as shown in FIG. 2. This limited counterclockwise rotation of the walking beam 76 operates in a manner as is again more fully described in U.S. Pat. No. 4,040,072, supra, to affect the release of the shutter latch 104 while at the same time affecting the closure of the switches $S_2$ and $S_3$ (block D).

Closure of the switch $S_3$ also operates to signal a solenoid hold logic circuit 117 to provide an affirmative logic signal to the motor and solenoid circuit 110 so as to power down the solenoid 88 from the high initial current energization condition required to retract the plunger 90, to a low current energization condition (block E) required to hold the plunger in its retracted position as shown in FIG. 2 and as is fully described in U.S. Pat. No. 4,192,587, supra.

Closure of the switch $S_3$ also operates to actuate the sonar rangefinder 22 to transmit a sonar ranging signal 28 (block E) in the following manner. Closure of the switch $S_3$ provides an affirmative logic signal to an inhibit circuit 118 so as to remove the inhibit imposed on the sonar rangefinder circuit 22 and thereby actuate the sonar rangefinding circuit 22 to issue a transmit commence signal to the sonic transducer 26. The latch 20 is withdrawn in response to the transmit command issued by the ranging circuit 24 thereby releasing the lens assembly 12 to move from its close-up focus position (solid lines) towards its far distance focus position (phantom lines). A lens halting mechanism as shown generally at 15 operates in response to the output of the echo detector 30 which detects the echo signal reflected from the photographic subject 16 at an elapsed time interval subsequent to the transmission of the sonar ranging signal (block F). The lens halt mechanism 15 thereby operates to interrupt the movement of the lens assembly 12 subsequent to its initial displacement from its close-up focus position at an elapsed time interval which correlates to the elapsed time interval between transmission of the sonar ranging signal and receipt of the echo from the photographic subject. The photographic subject will thus preferably be focused in the elapsed time interval (real time) between the transmission of the sonar ranging signal and the receipt of the echo by the sonic rangefinder 22. As will be readily understood, the dynamic characteristics of the lens assembly 12 drive, which in the aforementioned example constitutes the spring 18, operates to move the lens assembly through its plurality of focal positions at a rate such that the lens assembly 12 reaches each one of its plurality of focal positions at substantially the same time at which an echo from the sonar ranging signal could be received by the echo detector 30 subsequent to being reflected from a subject located at the camera-to-subject distance directly corresponding to that one focal position.

Closure of the switches $S_2$ and $S_3$ which operate to power down the solenoid 88 to its holding current mode and to commence the transmission of the sonar ranging signal in the aforementioned manner also provides an affirmative logic signal to enable an up/down counter as shown generally at 120 (block E). The up/down counter 120 is thus disabled prior to the closure of the switch $S_3$ while the solenoid 88 is in its current driving mode and is thereafter enabled to provide a count by an affirmative logic signal provided upon closure of the switch $S_3$ in a manner as is more fully described in U.S. Pat. No. 4,192,587, supra. A count is provided to the up/down counter 120 by an oscillator 126 which provides a 30 kilohertz output clock pulse train. The 30 kilohertz output clock pulse train from the oscillator 126, in turn, is directed simultaneously to a first divide circuit 128 wherein the 30 kilohertz clock pulse train is divided to provide an output clock pulse train of 18 kilohertz and another divide circuit 130 wherein the 30 kilohertz clock pulse is divided to provide a 10 kilohertz output clock pulse train for reasons which will become apparent from the following discussion. The output clock pulse trains from the divide circuits 128 and 130, in turn, are directed to a gate 132 which directs one of the inputted clock pulse trains to the up/down counter 120 in a manner to be subsequently described.

The output from the rangefinding circuit 22 is directed to a receive echo latch circuit 138 which prior to the receipt of the echo signal provides an affirmative logic signal to the up/down terminal of the counter 120 so as to set the mode of the counter 120 to count "up" prior to receipt of the ranging signal. The affirmative logic signal provided by the receive echo latch 138 prior to receipt of the ranging signal is also directed to the gate 132 so as to set the gate 132 to transmit the 10 kilohertz clock pulse train from the divide circuit 130 to input the up/down counter 120. In this manner the up/down counter 120 is actuated to count up the 10 kilohertz clock pulse at the instant that the sonar ranging signal is transmitted by the sonar rangefinding circuit 22 (block E).

As is readily apparent, movement of the shutter blade mechanism 32 to its terminal position as shown in FIG. 2 also operates to move the scene brightness detect apertures 100 and 102 from their positions as shown in FIG. 2a into overlapping relationship with respect to each other as shown in FIG. 2 so as to admit scene light through the top half lens portion 64 of the photocell lens 62 to the photoresponsive element 58. The photoresponsive element 58, in turn, responds to the incident ambient scene light to provide an output signal to a light integrating circuit 136 as shown in FIG. 1. The light integrating circuit 136 integrates the output signal in a manner to be subsequently described in greater detail herein from the photoresponsive element 58 to provide an output signal to a brightness measurement circuit as shown generally at 134 (block E). The brightness measurement circuit 134, in turn, provides a first selected logic output signal level if the detected scene light intensity is below a determinate level and a second selected logic signal level if the intensity of detected scene light is above the determinate level. The determinate level above which the brightness measurement provides the second logic signal level and below which it provides the first logic signal level is preferably established to be 10 c/ft$^2$. The logic signals from the brightness measurement circuit 134, in turn, are simultaneously directed to the gate 132 to control the gate 132 in a manner to be subsequently described and to a quench level gate 140 for reasons also to be subsequently described.

Receipt of the echo signal by the transducer 26 signals the echo detector 30 to provide an output signal to trigger the receive echo latch 138 so as to remove the affirmative output logic signal therefrom to the gate 132 and thereby stop the 10 kilohertz clock pulse from being counted by the up/down counter 120 while at the same time changing the counter 120 from an "up" mode of counting to a "down" mode of counting (block F) in a manner as is fully described in U.S. Pat. No. 4,192,587, supra. The change in the affirmative logic signal level from the receive echo latch 138 upon the receipt of the echo signal by the sonar rangefinder 22 is also directed to the motor and solenoid control circuit 110 so as to affect the deenergization of the solenoid 88 and thereby commence the exposure cycle (block F). The change in the output of the affirmative logic signal from the receive echo latch 138 upon the receipt of the echo signal by the rangefinder 22 is also directed to a delay circuit 142. The output from the delay circuit 142, in turn, is directed to energize the LED 116 (block G) for reasons which will become more apparent from the following discussion.

In the event that the photographic subject should be located at an infinite distance from the camera, which by way of this example may be considered to be any distance greater than 30 feet, then the counter 120 will fill and provide an affirmative logic signal level at output terminal α (block F). The affirmative logic signal provided from the output terminal α of the up/down counter 120 upon an infinite count is identical to the change in the output signal level provided from the receive echo latch 138 upon receipt of the echo signal by the sonar rangefinder 22 and thereby operates in the aforementioned manner to terminate the "up" count by the counter 120 while simultaneously deenergizing the solenoid 88 to release the shutter blade elements 34 and 36 to commence an exposure cycle (block F). As previously discussed, the LED 116 is thereafter energized to provide light 10 milliseconds after the shutter blade elements are released.

The deenergization of the solenoid 88 results in a clockwise rotation of the walking beam 76 under the biasing force of compression spring 98 from its scene light blocking position as shown in FIG. 2 toward its maximum scene light admitting position as shown in FIG. 3. As is readily apparent, the walking beam 76 must be rotated through a limited degree before the primary scene light admitting apertures 40 and 42 overlap to admit scene light to the focal plane 14. Whereas the photocell sweep secondary apertures 48, 50, 52 and 54 move in correspondence with the primary apertures 40 and 42, the walking beam 76 must be rotated through a limited number of degrees before the first scene light is also admitted by the photocell sweep secondary apertures to the photoresponsive elements 58 and 60.

The LED 116 is preferably aligned coaxially with respect to the photoresponsive element 58 on the opposite side of the shutter blade elements 34 and 36 so as to provide illumination detectable by the photoresponsive element 58 when the secondary apertures 48 and 50 first overlap without interfering with the transmission of scene light through the apertures 48 and 50. Alternatively, separate apertures may be provided to admit the light from the LED 116 to the photoresponsive element 58 in synchronism with the commencement of the exposure interval as further described in U.S. Pat. No. 3,628,437, entitled "Photographic Camera", issued Dec. 21, 1971, and now incorporated by reference herein. As previously described, the LED 116 is energized to provide illumination 10 milliseconds subsequent to the release of the shutter blade elements 34 and 36 (block G). The 10 millisecond delay in energizing the LED 116 assures that light from the LED will not be admitted to the photoresponsive element 58 by the scene brightness detect apertures 100 and 102. Thus regardless of the actual ambient scene light conditions, an indication may be provided as to the first instance at which the primary apertures 40 and 42 overlap to admit scene light to the focal plane 14 by way of the light from the LED 116 being admitted to the photoresponsive element 58 at the instant that the secondary apertures 48 and 50 first overlap.

The photoresponsive element 58 responds to the light emitted from the LED 116 at the instant that the secondary apertures 48 and 50 first overlap to provide an output signal to the integrator 136. The integrator circuit 136 comprises a current-to-frequency converter 144 the output of which is directed to a gate 146 which, in turn, provides an output to a counter 148. The current-to-frequency converter 144 may be of a type as is fully described in U.S. Pat. No. 4,306,786, entitled "Photographic Exposure Control With Scene Light Integration Level Determined as Function of Preexposure Ambient Scene Light Detect", by P. P. Carcia et al., issued Dec. 22, 1981, in common assignment herewith and now incorporated by reference herein. The integration circuit 136 is turned on in coincidence with the LED 116 by receipt of an affirmative logic signal from the delay circuit 142 to enable the counter 148 to start counting. The output from the integrator 136, in turn, is directed to three counter decode circuits 158, 160 and 162. The decode circuit 158 is signaled to provide an affirmative logic signal to enable the gate 132 upon the detection of the first light provided by the LED 116. The decode circuit 158 may be signaled to provide its affirmative logic output signal upon the counter 148 counting pulses equivalent to 0.1 of an optimum exposure value. The affirmative logic output signal from the decode circuit 158 is also directed to the LED 116 so as to turn off the LED (block G).

The gate 132 is thus enabled to transmit one of the clock pulse trains from either the divide circuit 128 or the divide circuit 130 to the up/down counter 120 upon receipt of an affirmative logic signal from the decode circuit 158 at the commencement of the exposure interval. As was previously discussed, the counter 120 is already in a "down" mode and will count down the respective clock pulse train provided thereto by the gate 132. Under low ambient scene light conditions where the scene light intensity is less than 10 c/ft$^2$, the gate 132 will be enabled by the brightness measurement circuit 134 to gate the 10 kilohertz clock pulse train to the counter 120 and the counter 120 will count down at the same rate at which it previously counted up (block O). Conversely, under high ambient scene light intensity conditions (above 10 c/ft$^2$), the gate 132 will be enabled by the brightness measurement circuit 134 to gate the 18 kilohertz clock pulse train to the counter 120 and will count down at a rate of 1.8 times faster than the rate it previously counted up (block H).

The decode circuit 160 is connected to decode the counter 148 upon detection of sufficient scene light to provide at least 0.7 of the optimum exposure value. In like manner, the decode circuit 162 is connected to decode the counter 148 upon detection of scene light sufficient to provide an optimum exposure value. Thus, under conditions of low ambient scene light intensity of less than 10 c/ft$^2$, the counter 120 will count down to empty prior to the output from the light integrator 136 reaching a sufficient count to signal the decode 160. When the counter 120 empties, a counter status circuit 122 will switch to provide an affirmative logic output signal which will be gated by an OR gate 124 to both disable the counter 120 and to provide a flash fire signal to the strobe 106. Thus, the strobe 106 and its associated flash tube is fired in a well-known manner (block P). The counter 120 by counting down the 10 kilohertz input clock pulse provides a range responsive time signal commencing in correspondence with the initiation of the exposure interval and terminating at a subsequent time corresponding to the distance between the camera and the subject to be photographed. In this manner, the strobe is fired at a "hybrid" aperture slightly larger than the so-called "follow-focus" aperture. As will be readily understood, the "follow-focus" aperture is the appropriate exposure aperture size which would be computed based on the determined camera-to-subject distance, i.e., focus distance, utilizing the inverse square law of light energy propagation which may additionally be weighted to anticipate spurious room reflections in a well-known manner.

The flash fire signal to the strobe 106 from the counter status circuit 122 is also directed to the gate circuit 146 so as to switch the gate from its previous mode in which the output from the current-to-frequency converter 144 was directed to the counter 148 to another mode in which the output from a sample frequency circuit 164 is directed to the counter 148 for the anticipated duration of the electronic flash pulse. The frequency of the output clock pulse train from the sample frequency circuit 164 may be derived in a well-known manner from the frequency of the clock pulse train provided by the current-to-frequency converter 144 immediately prior to the firing of the strobe 106.

The flash fire signal to the strobe 106 is also simultaneously directed to a light integrator circuit 166 which may be of a well-known analog type which integrates the output signal from the photo-responsive element 60. The output signal from the light integrator 166 is directed to two level detect circuits 168 and 170 which trigger respectively in response to the detection and integration of light sufficient to provide 0.3 of the optimum exposure value and 1.0 of the optimum exposure value. The outputs from the quench level detectors 168 and 170, in turn, are directed to the quench level gate 140 which is controlled as a function of the previous brightness measurement from the brightness measurement circuit 134. Thus, under the aforementioned conditions of low ambient scene light intensity of less than 10 c/ft$^2$, the brightness measurement circuit 134 provides an affirmative output logic signal to the quench level gate 140 so as to enable the gate 140 to transmit the output response from the quench level detect circuit 170. Thus, the photo-responsive element 60 and the light integrator 166 will detect and integrate, respectively, the flash light reflected from the photographic subject 16 until triggering the quench level detect circuit 170 so as to provide an affirmative logic signal which will be transmitted by way of the quench level gate 140 to provide a quench signal to the quench strobe 106 (block Q).

As is now readily apparent, the flash quench signal is provided as a function of the detection of reflected flash light through an effective secondary aperture, i.e., defined by the overlapping photocell sweep apertures 52 and 54, which corresponds to the effective primary aperture defined by the overlapping apertures 40 and 42. In addition, since the incident scene light to the photo-responsive element 60 is directed through the bottom half lens portion 66, there is provided a different spectral response to the light energy controlling the strobe quench than the spectral response of the light energy transmitted by the top half lens portion 64 to the photo-responsive element 58 which ultimately determines the instant of shutter blade closing under conditions of high ambient scene light intensity above 10 c/ft$^2$ in a manner to be subsequently described. In this manner the quench strobe may be controlled as a function of the detection and integration of scene light spectrally weighted to include the infrared frequencies which are generally more uniformly reflected from the scene and thus provide less chance for the subject matter of the scene being overexposed particularly against a dark background.

Whereas the gate 146 operates during the duration of the flash firing to block the transmission of the clock pulse train from the current-to-frequency converter 44 and instead transmits the output clock pulse train from the sample frequency circuit 164 to the counter 148, there is in effect no integration of the reflected strobe light and the counter 148 will likely not count a sufficient number of clock pulses to signal the decode 160. However, the affirmative logic output signal from the counter status circuit 122 is also directed to a time delay circuit 154 which, in turn, switches after a predetermined time delay to provide an affirmative logic signal by way of an OR gate 156 to the motor and solenoid control circuit 110 so as to effect the energization of the solenoid 88 and drive the shutter blade elements 34 and 36 back to their scene light blocking arrangement as shown in FIG. 2. The time delay circuit 154 may be arranged to provide a shutter blade closing command signal 29 milliseconds subsequent to the initiation of the flash fire signal when the photographic subject is located at distances less than infinity from the camera and at one second subsequent to the termination of the flash fire pulse when the photographic subject is located at distances equal to infinity (greater than 30 feet) from the camera in a manner as is well-shown in U.S. Pat. No. 4,192,587, supra.

Under conditions of high ambient scene light intensity greater than 10 c/ft$^2$, it can be seen that the brightness measurement circuit 134 operates to provide an affirmative logic signal to the gate 132 so as to enable the transmission of the 18 kilohertz clock pulse train from the divide circuit 128 to the up/down counter 120. In addition, the affirmative logic signal from the brightness measurement circuit 134 is also directed to the quench level gate 140 so as to transmit the output signal upon the triggering of the quench level detect 168. Thus, the first light that is admitted to the photoresponsive element 58 from the LED 116 operates to signal the decode 158 in the aforementioned manner so as to enable the gate 132 to transmit the 15 kilohertz clock pulse train from the divide by two circuit 128 to the counter 120 and thereby initiate the aforementioned countdown in synchronization with the initiation of the film exposure (block H). Thus, there is provided a range responsive time signal commencing in correspondence with the initiation of the exposure interval and terminating at a subsequent time corresponding to the distance between the camera and the subject to be photographed.

In the event that the photographic subject is located close enough to the camera so that the counter 120 counts down to empty prior to the output signal from the integrator 136 being decoded by the decode 160, there will occur a switching of the counter status circuit 122 to provide an affirmative logic signal by way of an OR gate 124 to fire the quench strobe 106 in the aforementioned manner (block I). Again, the flash fire signal operates to control the gate 146 so that it discontinues the transmission of the output clock pulse train from the current-to-frequency converter 144 and instead transmits the output clock pulse train from the sample frequency circuit 164 to the counter 148. Simultaneous to this, the light integrator 166 is also enabled to integrate the light detected by the photoresponsive element 60 so as to provide an output to trigger the quench level detect 168. As previously discussed, the affirmative output signal from the triggered quench level detect 168 is transmitted by the quench level gate 140 to provide the quench signal to the strobe 106 (block J). Thus, the strobe is quenched subsequent to detecting an amount of reflected flash light sufficient to provide 0.3 of the optimum exposure value. At the same time the integrator 136 is disabled from integrating the scene light detected by the photoresponsive element 58 and instead provides an output which may be based upon the ambient scene light detected immediately prior to the firing of the strobe 106.

After the strobe 106 is quenched, the gate 146 is switched to again block the transmission of the output clock pulse train from the sample frequency circuit 164 and to again transmit the output clock pulse train from the current-to-frequency converter 144. Thus, the detection and integration of ambient scene light is resumed subsequent to firing the strobe until the counter 148 is decoded by the decode circuit 160 upon reaching a count indicative of the detection of an amount of scene light sufficient to provide 0.7 m of the optimum exposure value. The decode circuit 160 thereafter provides an affirmative logic signal to one input terminal of an AND gate 172 which was previously enabled by the affirmative output logic signal from the counter status circuit 122 to the other output terminal thereof by way of an OR gate 174. The affirmative logic output signal from the AND gate 172 is thereafter transmitted by the OR gate 156 to the motor and solenoid control circuit 110 so as to effect deenergization of the solenoid 88 and thereby rotate the shutter blade elements 34 and 36 back to their scene light blocking position as shown in FIG. 2 (block K).

In this manner means are provided for discounting the artificial illumination provided by the quench strobe 106 so that a select proportion of the optimum film exposure value is directly provided by ambient scene light, while the remaining proportion of the optimum film exposure value is directly attributable to the artificial scene light provided by the quench strobe 106. In the illustrated embodiment 30 percent of the optimum film exposure value may be directly attributable to the artificial scene light provided by the quench strobe 106, while 70 percent of the film exposure value may be directly attributable to the ambient scene light. These proportions are established, for example, by the 0.7 level at which the decode 160 is signaled and the 0.3 optimum film exposure level at which the quench detect 168 is triggered.

Also, it should be readily appreciated that by counting down at the faster clock rate of 18 kilohertz, there is provided a decrease in the duration of the range responsive time signal by a constant factor (1.8) in response to the high ambient scene light intensity above 10 c/ft$^2$. The decrease in the duration of the range responsive time signal affects the firing of the strobe 106 at a shorter time subsequent to the commencement of the exposure interval than the time at which the strobe 106 would otherwise be fired under conditions of low ambient scene light intensity of less than 10 c/ft$^2$. Whereas the opening speed of the shutter blade elements 34 and 36 is generally constant, it is readily apparent that the strobe 106 is fired sooner and at a smaller aperture during the high ambient scene light intensity mode of operation than during the aforementioned low ambient scene light intensity mode of operation. Preferably, the strobe 106 is fired at a determinate number of stops smaller aperture during the high ambient scene light intensity mode of operation than it would be during the low ambient scene light intensity mode of operation for a subject located at the same distance from the camera.

Photographic subjects may be located at too great a distance from the camera to maintain the aforementioned proportion between ambient and artificial scene light in which case there is provided a so-called transient mode of operation where the decode circuit 160 will be signaled to provide an affirmative output logic signal prior to the counter 120 emptying and signaling the counter status circuit 122 to provide its affirmative logic output signal. In this situation, the affirmative output logic signal from the decode circuit 160 will be directed by way of the OR gate 124 to provide the flash fire signal to the quench strobe 106 (block L). The strobe will fire in the aforementioned manner and the scene light detection and integration to quench the strobe will be by way of the photoresponsive element 60 and integrator 166, respectively, as previously described (block M). Subsequent to the quench signal, the photoresponsive element 58 will again provide the input signal to the integrator 136 which will continue to integrate until signaling the decode circuit 162 to provide an affirmative output logic signal. Thus, the affirmative output logic signal from the decode 162 will be directed by way of the OR gate 174 and AND gate 172 previously enabled by the affirmative output logic signal from the decode circuit 160 to provide by way of the OR gate 156, the shutter blade closing command signal to the motor and solenoid control circuit 110 (block N).

In the event that the counter 120 should empty prior to the decode circuit 162 being signaled, there will then be provided an affirmative output logic signal by the counter status circuit 122 which, in turn, will be directed by way of the OR gate 174 to the AND gate 172 previously enabled upon the decode circuit 160 being signaled. The affirmative output logic signal from the AND gate 172, in turn, will be gated by the OR gate 156 to provide the shutter blade closing command signal to the motor and solenoid control circuit (block S).

Thus, there exists a race condition between the light integrator integrating sufficient light to signal the decode circuit 162 to provide the shutter blade closing command enabling signal or the counter 120 counting down to empty so as to provide the shutter blade closing command enabling signal. As should be readily apparent, during this transient mode of operation the proportion of the film exposure value directly attributable to the artificial scene light provided by the quench strobe 106 decreases from the aforementioned 30 percent in direct correspondence with the increase in the subject-to-camera distance range until the artificial scene light provides no contribution to the film exposure which is the situation where the decode circuit 162 is signaled to provide the shutter blade closing command enabling signal prior to the counter 120 emptying.

In this manner there is provided a so-called "hybrid" exposure control system which is responsive to both firing a flash at an appropriate "hybrid" aperture size calculated to generally correspond to the determined camera-to-subject distance in accordance with the inverse square law of light and the detection and integration of reflected strobe light from the scene to provide a flash quenching signal. Thus, there is made possible an increased degree of correction with the so-called "hybrid" exposure control system, since a slight error in the determination of camera-to-subject range resulting in a slight error in the aperture at which the strobe is fired can be easily compensated by the detection and integration of the reflected strobe light to provide the flash quenching signal. In addition, by firing the strobe at the "hybrid" aperture, the amount of overexposure possible becomes substantially reduced in comparison to a photographic system which depends solely upon the integration of reflected strobe light.

Other embodiments of the invention, including additions, subtractions, deletions and other modifications of the preferred disclosed embodiments of the invention will be obvious to those skilled in the art and are within the scope of the following claims. For instance, the objective lens arrangement 12 herein described may alternatively be a lens disk comprising a plurality of circumferentially spaced apart lens elements with the lens disk being actuated upon initial movement of the walking beam in a manner as is more fully described in U.S. Pat. No. 4,167,316, supra.

What is claimed is:

1. A photographic camera for use with an electronic flash of the quench type and including means for defining a film plane, said camera comprising:

rangefinding means for providing an output response generally corresponding to the distance from the camera to a photographic subject to be photographed;

a blade mechanism;

means for mounting said blade mechanism for displacement from an initial closed arrangement wherein said blade mechanism precludes scene light from being transmitted to the film plane to an open arrangement wherein said blade mechanism defines a maximum size aperture to allow the passage of scene light to the film plane and then to a final closed arrangement wherein said blade mechanism again precludes scene light from being transmitted to the film plane;

drive means responsive to the actuation thereof for effecting the displacement of said blade mechanism from its initial closed arrangement to its said open arrangement and then into its final closed arrangement to define an exposure interval during which scene light is incident upon the film plane;

means for detecting and integrating scene light in correspondence with the scene light admitted by said blades mechanism to the film plane during the photographic exposure interval and for providing an output signal in response to the detected and integrated scene light; and control means responsive to the output response from said rangefinding means for providing a flash fire signal during the exposure interval to ignite the electronic flash when said blade mechanism defines an aperture value corresponding to said camera-to-subject distance and thereafter responding to said output signal from said scene light detecting and integrating means for providing a quench signal for quenching the electronic flash, whereby said exposure is determined as a hybrid function of both camera-to-subject range and scene brightness, wherein said scene light detecting and integrating means comprises first and second photoresponsive elements for receiving scene light in correspondence with the scene light admitted by said blade mechanism to the film plane to provide a first output signal responsive to the scene light incident to said first photocell and a second output signal responsive to the scene light incident to said second photocell and wherein said control means responds to said first output signal from said scene light detecting and integrating means for providing a blade close command signal to actuate said drive means to effect the displacement of said blade mechanism back to its said final closed arrangement and to said second output signal from said second light detecting and integrating means for providing said quench signal.

2. The photographic camera of claim 1 wherein said control means maintains a select ratio between that portion of the film exposure attributable to ambient scene light and reflected flash light within determinate limits of camera-to-subject distance and ambient scene light intensity.

3. The photographic camera of claim 1 wherein the detection and integration of scene light by way of said second photoresponsive element is initiated in response to said flash fire signal and wherein the detection and integration of scene light by way of said first photoresponsive element is terminated in response to said flash fire signal for a determinate holding interval generally corresponding to the time during which the flash is fired.

4. The photographic camera of claim 3 wherein said means for detecting and integrating scene light also includes scene brightness detection means for providing prior to the exposure interval either a high scene light signal responsive to the detection of ambient scene light above a select level or a low scene light signal responsive to the detection of ambient scene light below said select level and wherein said control means operates when said scene brightness means provides said low scene light signal to provide said quench signal upon the detection and integration of substantially more scene light than is required to provide said quench signal when said scene brightness means provides said high scene light signal.

5. The photographic camera of claim 3 including means for assuring that the spectral characteristic of the scene light incident to said first photoresponsive element is different from the spectral characteristic of the scene light incident to said second photoresponsive element.

6. A photographic camera for use with an electronic flash of the quench type and including means for defining a film plane, said camera comprising:
  a blade mechanism;
  means for mounting said blade mechanism for displacement from an initial closed arrangement wherein said blade mechanism precludes scene light from being transmitted to the film plane to an open arrangement wherein said blade mechanism defines a maximum size aperture to allow the passage of scene light to the film plane and then to a final closed arrangement wherein said blade mechanism again precludes scene light from being transmitted to the film plane;
  drive means responsive to the actuation thereof for effecting the displacement of said blade mechanism from its initial closed arrangement to its said open arrangement and then into its final closed arrangement to define an exposure interval during which scene light is incident upon the film plane;
  means for detecting and integrating scene light comprising first and second photoresponsive elements for receiving scene light in correspondence with the scene light admitted by said blade mechanism to the film plane to provide a first output signal responsive only to the scene light incident to said first photocell and a second output signal responsive only to the scene light incident to said second photocell; and
  control means for effecting an exposure interval and providing a flash fire signal during the exposure interval when said blade mechanism defines an appropriate aperture value, said control means responding to said first output signal from said scene light detecting and integrating means exclusive of said second output signal to provide a blade close command signal to actuate said drive means to effect the displacement of said blade mechanism back to its said final closed arrangement and to said second output signal from said scene light detecting and integrating means exclusive of said first output signal to provide a quench signal to quench the electronic flash.

7. The photographic camera of claim 6 wherein said control means maintains a select ratio between that portion of the film exposure attributable to ambient scene light and reflected flash light within determinate limits of camera-to-subject distance and ambient scene light intensity.

8. The photographic camera of claim 7 wherein the detection and integration of scene light by way of said second photoresponsive element is initiated in response to said flash fire signal and wherein the detection and integration of scene light by way of said first photoresponsive element is terminated in response to said flash fire signal for a determinate holding interval generally corresponding to the time during which the flash is fired.

9. The photographic camera of claim 8 wherein said means for detecting and integrating scene light also includes scene brightness detection means for providing prior to the exposure interval either a high scene light signal responsive to the detection of ambient scene light above a select level or a low scene light signal responsive to the detection of ambient scene light below said select level and wherein said control means operates when said scene brightness means provides said low scene light signal to provide said quench signal upon the detection and integration of substantially more scene light than is required to provide said quench signal when said scene brightness means provides said high scene light signal.

10. The photographic camera of claim 9 including means for assuring that the spectral characteristics of the scene light incident to said first photoresponsive element is different from the spectral characteristics of the scene light incident to said second photoresponsive element.

* * * * *